Figure 1:
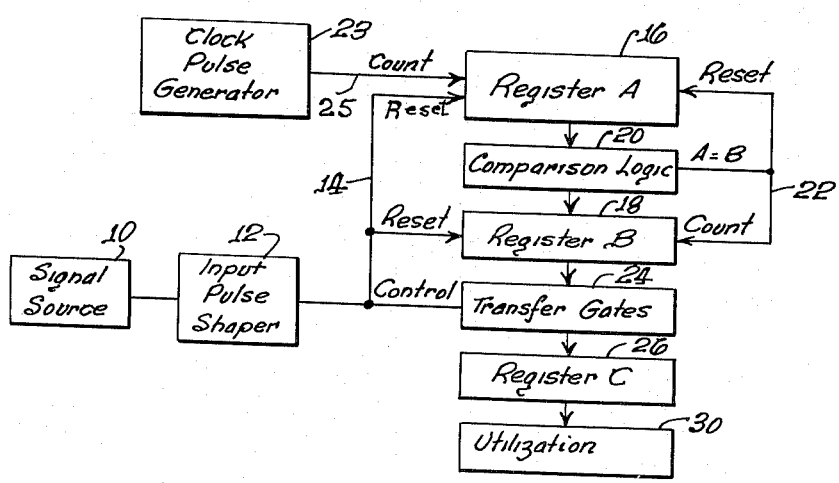

JERRY H. STYNER,
INVENTOR.

BY

Barbour & Lewis

United States Patent Office 3,225,181
Patented Dec. 21, 1965

3,225,181
DIGITAL COMPUTING SYSTEM FOR
SQUARE ROOTS
Jerry H. Styner, Woodland Hills, Calif., assignor to Giannini Controls Corporation, Duarte, Calif., a corporation of New York
Filed Sept. 28, 1962, Ser. No. 226,821
4 Claims. (Cl. 235—158)

This invention has to do with computation by means of digital techniques, and relates more particularly to such computation of the square root of the time between successive events of a sequential series.

Such computation may be useful for a wide variety of purposes. For example, if sequential events occur at an average rate that is inversely proportional to the square of an independent variable, the square root of the time between such events provides a measure of the independent variable.

More particularly, if nuclear emissions are detected at a variable distance from the source, the average detection rate is typically proportional to the square of the distance. Computation of a number proportional to the square root of the time between successive particles then provides a direct measure of the distance.

A primary purpose of the present invention is to provide means for computing a number proportional to the square root of the time between successive events, utilizing digital techniques.

A further object of the invention is to provide such calculation on an "on-time" basis, that is, to produce an output that continuously represents the current value of the square root of the time between successive events of a continuing series. The output may then be utilized in any desired manner, as for recording or for further computations, which may be carried out by digital or other procedures. For example, the described output may be converted to analogue form and then smoothed by suitable filtering to obtain an average value having the desired time constant.

A full understanding of the invention and of its further objects and advantages will be had from the following description of certain illustrative manners in which it may be carried out, of which description the accompanying drawings form a part. The particulars of that description are intended only as illustration of the invention, and not as a limitation upon its scope, which is defined in the appended claims.

Figure 2:
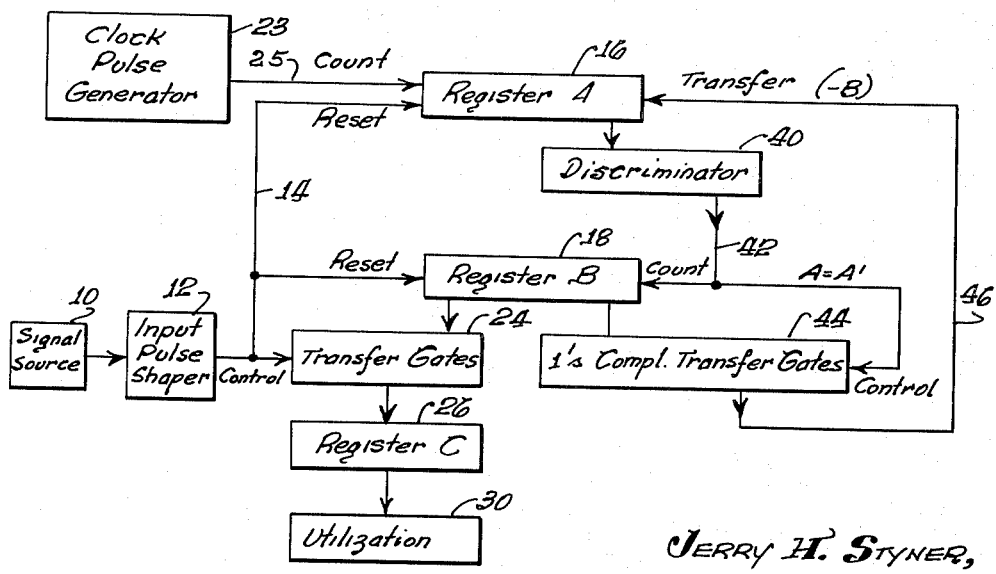

In the drawings:

FIG. 1 is a schematic drawing representing an illustrative embodiment of the invention; and FIG. 2 is a schematic drawing representing a modification.

As illustratively shown in FIG. 1, a source of input signals is represented schematically at 10, producing a continuing sequence of signals which typically correspond to respective events. The signals from source 10 may be periodic in nature, with gradually variable period; or may be spaced randomly in time, with variable average time spacing. Many such signal sources are well known. For example, source 10 may represent a shaft that rotates at variable speed and develops a sinusoidally periodic electrical signal. Alternatively, source 10 may be a sensor responsive to nuclear emissions incident upon it in random fashion from a radioactive source.

The signals from source 10 are suitably shaped by circuitry of conventional type represented at 12 to form sharp electrical pulses on the line 14. Those pulses perform three distinct functions, to be described.

First and second counting registers are represented schematically at 16 and 18, respectively, and will be denoted A and B for convenience of reference. Registers A and B are memory devices of digital type shiftable among a plurality of states which represent respective values of a variable number. The registers have respective counting and reset input circuits. The number stored in the register is increased by unity in response to a counting pulse supplied to the counting input; and is returned to zero in response to a reset pulse supplied to the reset input. The registers typically comprise flip-flops, magnetic cores, or other suitable memory devices which are connected through suitable known logic implementing devices such as diodes or transistors in such a manner as to represent the stored number in binary or other coded form. Whereas a very wide variety of conventional constructions may be used, the two registers are of similar type, such that any given number is represented in the two registers by corresponding states. In practice it is usually convenient to utilize identical registers for A and B.

A clock pulse generator, indicated schematically at 23, produces a periodic series of signals which define definite, equally spaced times. Those signals are typically sharp pulses, and will be referred to as clock pulses. They are delivered via the line 25 to the counting input circuit of register A. Hence the number stored in register A increases uniformly at a predetermined rate corresponding to the clock period. Clock pulse generator 23 typically comprises a crystal oscillator or similar timing device and suitable shaping circuitry for producing well-defined, uniformly periodic clock pulses. The clock pulse generator preferably operates at a pulse rate at least about an order of magnitude higher than the maximum expected rate of input pulses from source 10. The registers and logic circuitry of the entire system are suitably designed to perform each of the described operations in a time short compared to the time between successive clock pulses.

Registers A and B are connected to circuit means indicated schematically at 20 comprising comparison logic, typically of conventional type. Comparison logic 20 continually compares the number stored in register A with the number stored in register B. When the states of the two registers A and B are exactly identical, the comparison logic produces a sharp pulse on the line 22. In practice, that control pulse is normally the next clock pulse after the equality of A and B is detected, the comparison circuitry acting as a gate to transmit that clock pulse to line 22. That pulse is supplied from line 22 to the reset input circuit of register A, returning that register to the condition representing the number zero, or if gated clock pulses are supplied, to the condition representing the number one. The pulse on line 22 is also supplied to the counting input of register B, increasing the number stored in that register by unity.

The system includes output circuitry, represented illustratively as the register 26, which will be denoted C, and the transfer gates 24. Register C is a storage device having a plurality of alternative states that uniquely represent the numbers that can be stored in register B. Register C is typically identical to B, except that no reset input circuit is usually required; and the counting input circuit is adapted, on energization of transfer gates 24, to shift the entire register C to the state directly corresponding to the existing state of register B. Register C then continues to represent the same number until the tranfer gates are again energized. Transfer gates 24 include input or control circuits by which they are all simultaneously energized by a single control pulse.

The information in register C is supplied to any desired output or utilization device, represented schematically at 30. That device may represent a digital or other recorder, a computing device of any suitable type adapted to handle input information of digital form, or may include a digital-to-analogue converter of conventional type and suitable means for recording or further processing the resulting analogue signal.

Each of the input pulses on line 14 is utilized for the three distinct functions of resetting register A, resetting register B, and energizing transfer gates 24. For that purpose line 14 is typically connected to the reset input circuits of registers A and B, and to the control circuits of tranfer gates 24. Isolating devices of suitable type, not explicitly shown, may be provided if desired between those various input circuits to prevent undesired interaction between the several parts of the system.

In operation of the illustrative system of FIG. 1, if all three registers are in initial condition, assumed to represent the number one, comparison logic 20 immediately senses the identical states of A and B, so that the first clock pulse produces a control pulse on line 22. That pulse shifts B to the condition two; and the reset pulse to register A is ineffective, since that register is already in initial state.

The next clock pulse from generator 23 shifts A to the number two, making A and B again identical. Hence the third clock pulse appears on line 22, shifting B to three and resetting A to one. In the following cycle two clock pulses are required before A and B become equal; and the third clock pulse shifts B to four. The number of clock pulses counted in register A always equals the number already stored in register B. If registers A and B are reset to zero state rather than to one, the action is essentially the same except that the number of clock pulses counted in register A during each series equals the number stored in B after completion of the series. For series of suitable length, typically exceeding ten pulses as a minimum, the difference between those relations is not significant. In either case the count in B is progressively increased, but at a rate that steadily decreases in direct proportion to the increasing count. More precisely, the rate of increase of the count in B is equal to $1/B$ times the clock rate. If the clock rate is represented by $K/2$, $$\frac{dB}{dt} = \frac{K}{2B} \qquad (1)$$

or $$Kdt = 2BdB \qquad (2)$$

If Equation 2 is integrated over the time $\Delta t$ between two successive input pulses, one obtains:

$$B = \sqrt{K\Delta t} \qquad (3)$$

Since the clock rate was taken as $K/2$, the total number of clock pulses during the interval $\Delta t$ is $N = K\Delta t/2$ and Equation 3 can be written $$B = \sqrt{2N} \qquad (3a)$$

From 3a it is evident that B may be considered as continuously providing a measure of the square root of the total number $N$ of clock pulses since the last previous input pulse. For the purpose of such computation of $\sqrt{N}$ it is obviously immaterial whether the "clock pulses" occur at a uniform rate.

Through the operation of the transfer logic, the number B in Equation 3 is transferred at each input pulse to register C. Hence, the number in C continuously indicates the value:

$$C = \sqrt{K\Delta t} \qquad (4)$$

To indicate the utility of the invention, consider a series of events S which occur in such a way that the average rate of events is inversely proportional to the square of some independent variable $x$, which may, for example, represent a distance. Then $$\dot{S} = \frac{dS}{dt} = k/x^2 \qquad (5)$$

where $k$ is a constant.

In order to compute a value for $x$ at any time $t$, one must continuously solve the equation $$x = \sqrt{\frac{k}{\dot{S}}} = \sqrt{k\frac{dt}{dS}} \qquad (6)$$

If the time between successive events is indicated by $t$, a useful approximation of Equation 6 may be written as $$x = \sqrt{k\Delta t} \qquad (7)$$

Comparison of Equations 4 and 7 shows that if the pulses from source 10 correspond to the events S, the number stored in register C is directly proportional to the desired value of the independent variable $x$:

$$x = \sqrt{K'C} \qquad (8)$$

where $K'$ represents the constant $\sqrt{k/K}$

The events indicated by S may be evenly periodic, or may occur in random fashion at an average rate that is inversely proportional to $x^2$. In the latter case it is convenient to supply the information in C to a digital-to-analogue converter and to smooth the resulting analogue representation of the number C, as by a suitable filter circuit. Such apparatus, typically incorporated in utilization device 30, may be of conventional design and does not in itself constitute a part of the present invention. It is emphasized, however, that despite the quadratic relation in Equation 5, the averaging performed by such a smoothing circuit does not introduce any error to the linearity of its action, since the number C is directly proportional to $x$.

FIG. 2 represents a modified system which is illustrative of the wide variety of well known techniques by which functions equivalent to those described in connection with FIG. 1 may be accomplished. In the system of FIG. 2, as in FIG. 1, register A receives counting pulses from clock pulse generator 23; and the input pulses from signal source 10 and pulse shaper 12 are supplied to the reset input circuits of registers A and B and are also utilized to energize transfer gates 24 to transfer the count standing in register B to output register C. However, different circuitry is employed for developing a signal each time that the count in A has increased by an amount equal to the count standing in B, which signal resets A and increases the count in B.

Discriminator circuitry is provided at 40 responsive to the condition of register A and acting to produce a signal on the line 42 whenever the count A has a predetermined value, to which it is initially reset via line 14. That value may, for example, be chosen as the full count of which register A is capable, which will be denoted A' for convenience of reference. Circuitry 40 then typically comprises simply an output connection from register A, such as would supply a pulse to the flip-flop of the next higher digit if present. Register A thus acts as a gate for the clock pulses. The signal on line 42 is supplied to the counting input circuit of register B, and increases the count in B by unity. The signal on line 42 is also supplied to the transfer gates indicated schematically at 44, which are connected between register B and an input control circuit of register A. Transfer gates 44 are typically of conventional type and are so designed as to respond to the control pulse on line 42 by transferring to register A the one's complement of the count standing in register B, thereby shifting register A from the count A' to the count A'−B. Register A then requires B counts to "overflow" again, that is, to reach the count A'.

Each time that A "overflows," the signal on line 42 increases B by one count. The rate of increase of B is therefore the same function of the clock rate as in FIG. 1, and the previous analysis applies equally well to FIG. 2. The essence of the system is the addition of a definite count to register B each time that the count in A has increased by B.

It will be recognized without detailed analysis that many modifications can be made in the described systems without departing from the proper scope of the invention. For example, the input counting circuit of register B may be such that each signal on line 22 or 42 causes B to increase by $n$ counts instead of one, where $n$ is a predetermined integer. The preceding analysis is still applicable if the clock rate in Equation 1 is represented by $K/2n$ instead of $K/2$.

I claim:

1. A system for computing the square root of the time interval between successive input signals of a sequential series, said system comprising in combination
   first and second counting registers,
   means for increasing the count in the first register at a predetermined uniform rate,
   means acting to develop a control signal each time that said count increases by an amount equal to the count standing in the second register,
   means for increasing the count in the second register by a uniform amount in response to each said control signal,
   means for resetting the second register to initial condition in response to each input signal of said sequential series,
   and output means for producing a representation of the square root of said time interval in response to the count standing in the second register at the time of each said input signal.

2. A system for computing the square root of the time interval between successive input signals of a sequential series, said system comprising in combination
   first and second counting registers,
   means for increasing the count in the first register at a predetermined uniform rate,
   means acting to develop a control signal in response to a predetermined count in the first register,
   means acting in response to each said control signal to transfer to the first register the one's complement of the count standing in the second register and to increase the count in the second register by a uniform amount,
   means for resetting the second register to initial condition in response to each input signal of said sequential series,
   and output means for producing a representation of the square root of said time interval in response to the count standing in the second register immediately prior to said resetting thereof.

3. A system responsive to a series of input signals which occur at an average rate that is inversely proportional to the square of an independent variable, said system being adapted to comput a number proportional to said independent variable and comprising in combination
   first and second counting registers,
   means for increasing the count in the first register at a predetermined uniform rate that is large compared to the maximum rate of said input signals,
   means acting to develop a control signal each time that said count increases by an amount equal to the count standing in the second register,
   means for increasing the count in the second register by a uniform amount in response to each said control signal,
   means for resetting the second register to initial condition in response to each input signal,
   and output means for producing a representation of said number in response to the number represented by the second register immediately prior to said resetting thereof.

4. A system for computing the square root of a desired number, comprising in combination
   means for developing a series of counting signals,
   first and second counting registers,
   means for increasing the count in the first register by a uniform amount in response to each of said counting signals,
   means acting to develop a control signal each time that said count increases by an amount equal to the count standing in the second register,
   means for increasing the count in the second register by a uniform amount in response to each said control signal,
   and output means for producing a representation of said square root in response to the count standing in the second register when the number of counting signals equals said desired number.

References Cited by the Examiner

UNITED STATES PATENTS

| | | | |
|---|---|---|---|
| 2,997,234 | 8/1961 | Hughes | 235—160 |
| 3,126,475 | 3/1964 | Coddington et al. | 235—160 |

ROBERT C. BAILEY, *Primary Examiner.*

MALCOLM A. MORRISON, *Examiner.*